(12) United States Patent
Gu

(10) Patent No.: US 6,932,207 B2
(45) Date of Patent: Aug. 23, 2005

(54) WET MULTIPLATE CLUTCH

(75) Inventor: Xiaoming Gu, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/940,519

(22) Filed: Aug. 29, 2001

(65) Prior Publication Data

US 2002/0038748 A1 Apr. 4, 2002

(30) Foreign Application Priority Data

Sep. 1, 2000 (JP) .................................. 2000-265111

(51) Int. Cl.[7] ........................................ F16D 25/0638
(52) U.S. Cl. ............................ 192/70.14; 192/107 M
(58) Field of Search ......................... 192/70.12, 70.14, 192/107 M, 107 R, 70.28, 85 AA, 109 C, 113.34

(56) References Cited

U.S. PATENT DOCUMENTS

| | | | | | |
|---|---|---|---|---|---|
| 2,738,864 | A | * | 3/1956 | Becker | 192/70.14 |
| 3,446,323 | A | | 5/1969 | Hilpert | |
| 4,432,444 | A | * | 2/1984 | Hauser | 192/58.681 |
| 4,450,944 | A | * | 5/1984 | Fujioka et al. | 192/113.34 |
| 5,048,654 | A | * | 9/1991 | Yesnik | 188/251 A |
| H974 | H | * | 11/1991 | Mizobuchi et al. | 29/898.041 |
| 5,176,236 | A | * | 1/1993 | Ghidorzi et al. | 188/218 XL |
| 5,678,675 | A | * | 10/1997 | Dover et al. | 192/107 R |
| 5,788,035 | A | * | 8/1998 | Avers | 192/107 C |
| 5,918,713 | A | * | 7/1999 | Shimizu et al. | 192/107 C |
| 5,934,435 | A | * | 8/1999 | Bauer | 192/113.34 |
| 6,311,815 | B1 | * | 11/2001 | Riggle et al. | 192/70.14 |
| 6,585,095 | B2 | * | 7/2003 | Savoyard et al. | 192/70.12 |

FOREIGN PATENT DOCUMENTS

| | | | | | |
|---|---|---|---|---|---|
| JP | 59054825 | A | * | 3/1984 | F16D/25/063 |
| JP | 405231443 | A | * | 9/1993 | 192/70.14 |

OTHER PUBLICATIONS

English Translation—JP 59054825A; Shibata, Kazuhiko; Wet MultiPlated Frictional Engagement Device; Mar. 1984.*

* cited by examiner

Primary Examiner—Richard M. Lorence
(74) Attorney, Agent, or Firm—Crowell & Moring LLP

(57) ABSTRACT

A wet multiplate clutch is construction of plural friction plates and plural separator plates, which are alternately arranged. Between each two friction plates arranged adjacent to each other, plural separator plates are disposed.

7 Claims, 4 Drawing Sheets

WET MULTIPLATE CLUTCH

BACKGROUND OF THE INVENTION a) Field of the Invention

This invention relates to a wet multiplate clutch, which is useful primarily in a transmission for an automotive vehicle.

b) Description of the Related Art

FIG. 4 shows the basic construction of a wet multiplate clutch in cross-section. The wet multiplate clutch generally designated at numeral 1 is provided with a clutch case 2 and a hub 3, which are rotatable relative to each other. Plural separator plates 11 and plural friction plates 5 are spline-fitted on the clutch case 2 and the hub 3, respectively, such that the separator plates 11 and friction plates are movable in an axial direction. In the conventional example illustrated in FIG. 4, the separator plate 11 and the friction plates 5 are alternately arranged one by one.

Via the clutch 1, power is transmitted between the clutch case 2 and the hub 3. FIG. 4 also shows a spline groove 21 of the clutch case 2, a spline groove 31 of the hub 3, a piston 6, and a return spring 6 for the piston 6.

When transmission of power is desired, an application of pressure to a right side of the piston 6 as viewed in the drawing causes the piston 6 to move leftwards against the spring 7 so that the friction plates 5 and the separator plates 11 are brought into contact under pressure to transmit the power from the clutch case 2 to the hub 3. Designated at numeral 22 is a snap spring for supporting pressures from the piston. Release of the pressure on the right side of the piston 6 allows the piston 6 to return rightwards owing to the arrangement of the return spring 7, and the clutch is disengaged. In the drawing, an alternate long and short dash line X—X indicates a central axis.

When the separator plates 11 are caused to slidingly rotate relative to the friction plates 5, heat is produced. The wet multiplate clutch of the conventional construction, however, does not permit good transfer of the heat, resulting in development of thermal deformation called "heat spots" on the separator plates 11. FIG. 5 illustrates conditions of the separator plates 11 of the conventional wet multiplate clutch after a test. As shown in this drawing, heat spots 11H have been formed on the surfaces of the separator plates 11. Incidentally, sign 11A indicates spline tabs which are maintained in engagement with the corresponding spline grooves of the clutch case 2.

SUMMARY OF THE INVENTION

An object of the present invention is, therefore, to provide a wet multiplate clutch which can inhibit the occurrence of heat spots on separator plates.

In one aspect of the present invention, there is thus provided a wet multiplate clutch of a construction that plural friction plates and plural separator plates are alternately arranged, wherein between each two friction plates arranged adjacent to each other, plural separator plates are disposed.

The plural separator plates disposed between each two friction plates arranged adjacent to each other may be disposed separably from each other. Between each two mutually-adjacent ones of the plural separator plates disposed between each two friction plates arranged adjacent to each other, a thin member may be interposed. Each two mutually-adjacent ones of the plural separator plates disposed between each two friction plates arranged adjacent to each other maybe coated or machined at mutually-opposing surfaces thereof.

Owing to the disposition of the plural separator plates between each two friction plates arranged adjacent to each other, the wet multiplate clutch according to the present invention can exhibit an advantageous effect that the occurrence of heat spots on separator plates can be inhibited.

A friction material on the friction plates may be burnt black in some instances. As this burning takes place due to heat spots occurred on the separator plates, the inhibition of occurrence of heat spots makes it possible to prevent burning of the friction material.

DETAILED DESCRIPTION OF THE INVENTION AND PREFERRED EMBODIMENTS

Figure 1:
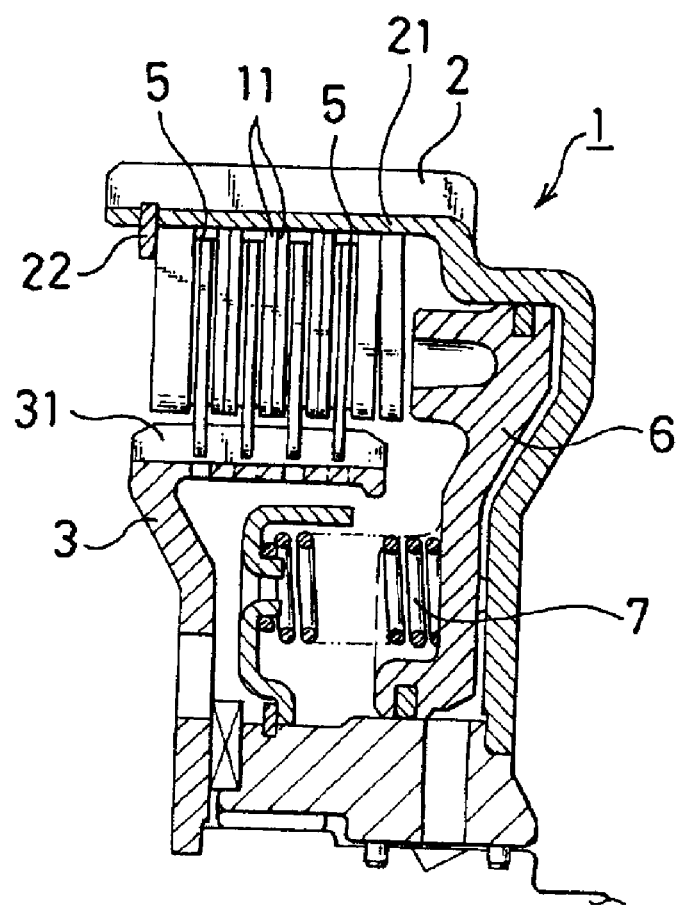
FIG. 1 is a cross-sectional view of a wet multiplate clutch according to a first embodiment of the present invention.

A relationship between the thickness of a separator plate and heat spots occurring on the separator plate is considered to be expressed by the following formula:

$$\Delta H = \Delta T \cdot W \cdot \alpha$$

where $\Delta H$: Height of heat spots, $\Delta T$: Temperature difference on the surface of the separator plate (i.e., a difference in temperature between the position of a heat spot and other position), W: Thickness of the separator plate, and $\alpha$: Coefficient of linear expansion.

The above formula indicates that a separator plate becomes more resistant to the occurrence of heat spots as the separator plate becomes thinner. If sliding rotation is continued after the occurrence of heat spots, the bearing stress becomes higher at the positions of the heat spots so that the temperature rises much faster at the positions of the heat spots than at other positions. As a result, the heat spots become still greater.

In the preferred embodiments of the present invention, plural separator plates (specifically, two to five separator plates) are disposed between each two friction plates arranged adjacent to each other. The thickness of each of these separator plates is set thinner than that of conventional separator plates (0.5 to 1.52 mm in the preferred embodiments of the present invention as opposed to 2.7 mm or so in the conventional art). This is to make their total heat capacity substantially equal to the heat capacity of the conventional friction plate, and also to provide spline tabs of these separator plates, said spline tabs being maintained in engagement with their corresponding spline grooves of a clutch case, with sufficient strength.

Further, the plural (two in this preferred embodiment) separator plates disposed between each two friction plates arranged adjacent to each other are disposed separably from each other. The "separably" as used herein means that the individual separator plates can completely separate from each other and can freely move.

These thin members are considered to be effective for heat insulation, damping and impact absorption between the individual separators. The term "damping" as used herein means to suppress vibrations of separators upon receipt of revolving power. The term "impact absorption" means that the thin members act as cushions between the separator plates. When separator plates have asperities, for example, the term "impact absorption" means that each thin member absorbs bearing stresses at asperities of one of associated separator plates and facilitates even contact of the separator plate with the other separator plate over the entire surfaces thereof.

The term "thin member" as used herein should be construed to embrace thin plates made of rubber, resin or a mixture thereof and thin fabrics such as nonwoven fabric, woven fabric and knit fabrics. Preferred examples can include a variety of paper, sheets, films, and gaskets.

More specific examples can include TEFLON® sheets, polyimide films, aramid films, fluorinated resin films, thermosetting resin films, polyoxymethylene films, fiber-reinforced, super engineering plastic films, polyethylene sulfide films, polyetherimide films, polyetherketone films, polyethersulfon films, carbon fiber sheets, silica fiber sheets, and silica paper.

Further, coatings are considered to have similar effects as the above-described thin members. A coating material is practically the same as an adhesive useful upon adhering separator plates together with a thin member interposed therebetween. Specific examples of the coating material can include thermosetting resins, engineering plastics, general-purpose resins, polymer alloys, butadiene nitrile rubber, and high-elasticity resin sheets.

The term "machined" as used herein means to be machined, for example, by shot blasting or shot peening. As a result of this machining, a very small clearance is maintained between the separator plates, bringing about an advantageous effect that holding of lubricating oil is facilitated. This surface machining is applicable no matter whether thin members such as those described above are interposed.

Figure 4:
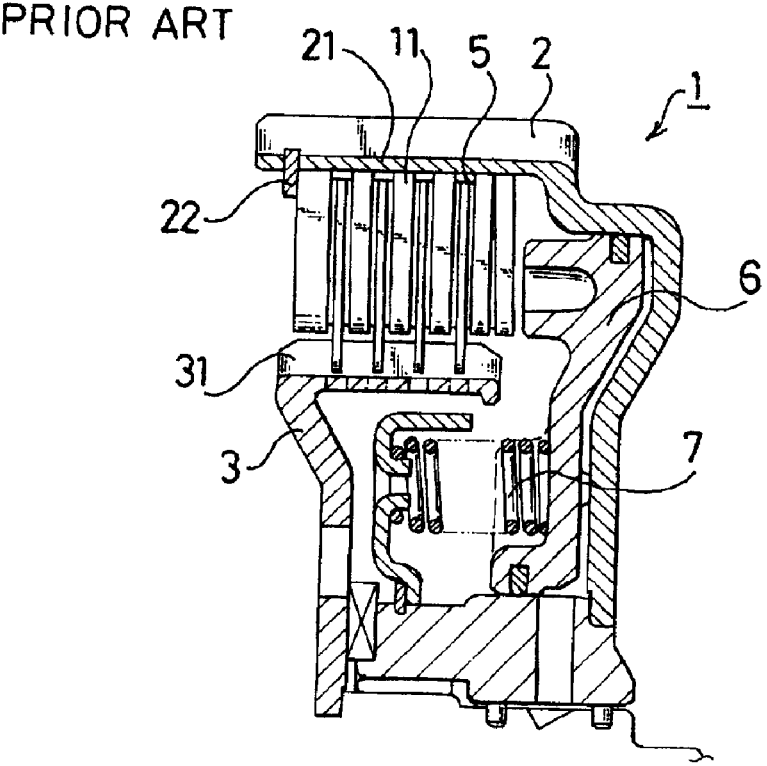
FIG. 4 is a cross-sectional view of a conventional wet multiplate clutch.

Referring to FIG. 1, the wet multiplate clutch according to the first embodiment of the present invention will be described. This wet multiplate clutch has the same basic construction as the conventional example shown in FIG. 4. In FIG. 1, those parts of the wet multiplate clutch which are the same as or equivalent to corresponding parts in FIG. 4 are shown by the same reference numerals.

In the first embodiment illustrated in FIG. 1, two separator plates 11 are disposed in a state independent from each other between each two friction plates 5 arranged adjacent to each other. The separator plates 11 have a thickness of 1.26 mm per plate, an inner diameter of 131.4 mm, an outer diameter of 151.7 mm, a friction area of 45.14 cm$^2$ per side, and a total area of 47.52 cm$^2$ per side. These dimensions of the inner and outer diameters and the areas are the same in the other embodiments to be described subsequently herein.

Figure 2:
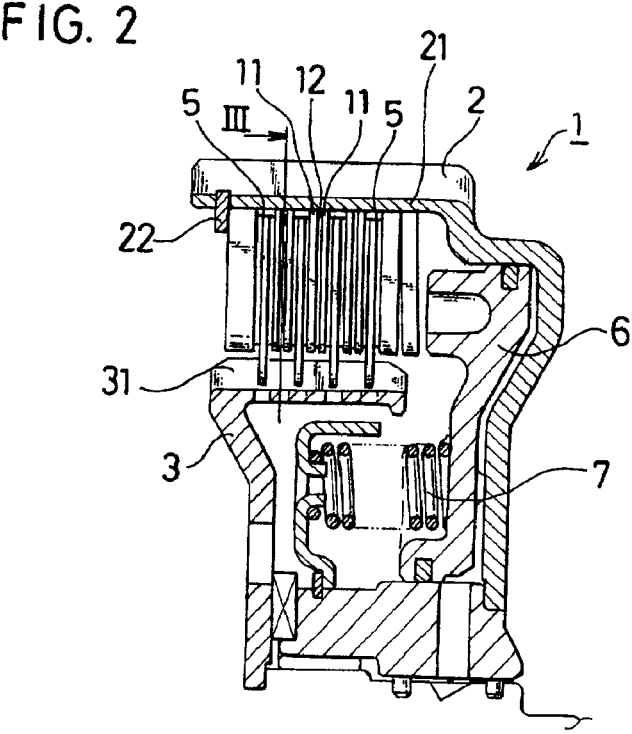
FIG. 2 is a cross-sectional view of a wet multiplate clutch according to a second embodiment of the present invention.

Reference is next had to FIG. 2. In the wet multiplate clutch according to the second embodiment of the present invention, a TEFLON® sheet 12 is interposed between each two separator plates 11 disposed adjacent to each other and having a thickness of 1.26 mm per plate as in the separator plates in the first embodiment.

Figure 3:
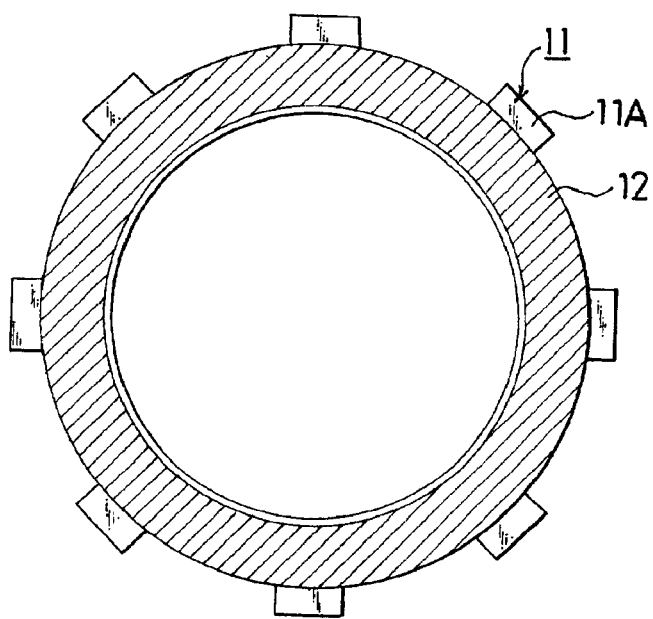
FIG. 3 is a front view of the wet multiplate clutch of FIG. 2, as viewed in the direction of arrows III—III.

FIG. 3 shows the TEFLON® sheet 12 and the separator plate 11 located behind the TEFLON® sheet 12. Sign 11A indicates spline tabs of the separator plate 11.

In addition, similar wet multiplate clutches were also constructed by arranging five separator plates of 0.5 mm in thickness per plate between each two friction plates arranged adjacent to each other (a third embodiment), three separator plates of 0.9 mm in thickness per plate between each two friction plates arranged adjacent to each other (a fourth embodiment), two separator plates of 1.4 mm in thickness per plate between each two friction plates arranged adjacent to each other (a fifth embodiment) and two separator plates of 1.52 mm in thickness per plate between each two friction plates arranged adjacent to each other (a sixth embodiment), respectively. The occurrence of heat spots was also inhibited in the third to sixth embodiments.

As mentioned above, the separator plates in the first to sixth embodiments were equally dimensioned as follows:

Inner diameter: 131.4 mm

Outer diameter: 151.7 mm

Friction area: 45.14 cm$^2$ per side

Total area: 47.52 cm$^2$ per side

Figure 5:
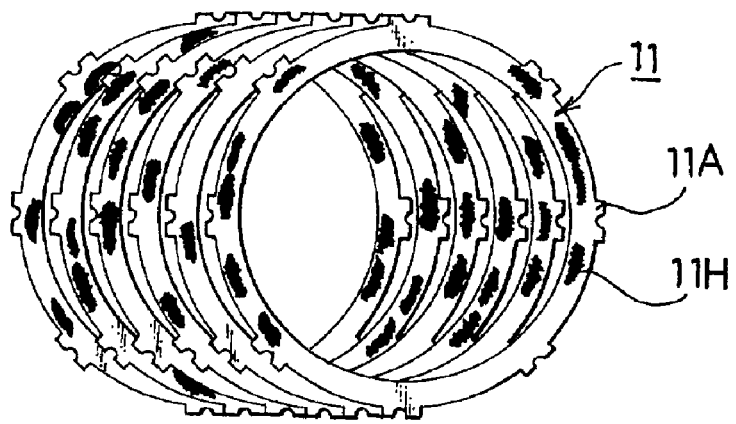
FIG. 5 is a perspective view of conventional separator plates, illustrating the results of a test.
Figure 6:
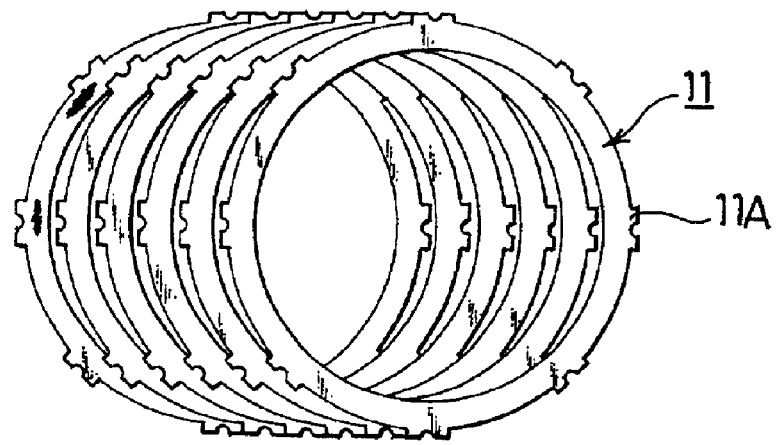
FIG. 6 is similar to FIG. 5, but illustrates the results of a test of separator plates in the wet multiplate clutch according to the first embodiment of the present invention.
Figure 7:
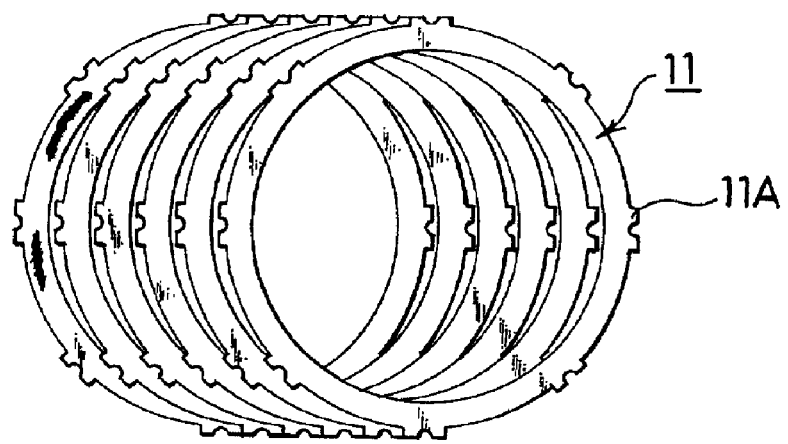
FIG. 7 is similar to FIG. 5, but illustrates the results of a test of separator plates in the wet multiplate clutch according to the second embodiment of the present invention.

As described above, FIG. 5 illustrates heat spots 11H occurred on the conventional separator plates as a result of a test. FIG. 6 and FIG. 7 show the results of tests of the wet multiplate clutches according to the first and second embodiments, respectively. It is readily appreciated from these drawings that the occurrence of heat spots was inhibited in the wet multiplate clutches of the first and second embodiments. Further, this heat-spot-inhibiting effect was also confirmed in the wet multiplate clutches of the third to six embodiments.

The tests were conducted under the following conditions:

Number of cycles: 2

Initial revolution speed: 8,100 r.p.m.

Inertia force: 0.196 kg·m$^2$ (when an inertial moment was caused to occur with a disk-shaped weight of about 10 kg)

Maximum bearing stress: 10 kgf/cm$^2$

Oil temperature at the time of a start: 100° C.

Feed rate of lubricating oil: 0.18 L/min (from the central axis)

Period of engagement: about 0.8 sec

In each of the above-described embodiments, two separator plates are disposed between each two (in other words, paired) friction plates arranged adjacent to each other. It may be contemplated to arrange only one separator plate between two friction plates in each of one or some of paired friction plates as in the conventional art and two separator plates between two friction plates in each of the remaining ones of the paired friction plates as in the first and second embodiments of the present invention. To assure an exhibition of the advantageous effect of the present invention, however, it is desired to arrange two separator plates between each two (i.e., paired) friction plates arranged adjacent to each other.

This application claims the priority of Japanese Patent Application 2000-265111 filed Sep. 1, 2000, which is incorporated herein by reference.

What is claimed is:

1. A wet multiplate clutch comprising plural friction plates and plural separator plates that are alternately arranged with the plural friction plates, wherein said separator plates are groove-free separator plates, wherein between each two friction plates arranged adjacent to each other, at least two of the plural groove-free separator plates are disposed separably from each other, wherein the at least two separator plates are completely separate from each other and can freely move independently of each other, and wherein each two mutually-adjacent ones of said plural groove-free separator plates disposed between each two friction plates arranged adjacent to each other have been coated at mutually-opposing surfaces thereof.

2. A wet multiplate clutch according to claim 1, wherein said groove-free separator plates have a thickness of from 0.5 to 1.52 mm per plate.

3. A wet multiplate clutch according to claim 1, wherein said mutually-opposing surfaces of said each two mutually adjacent groove-free separator plates have been coated with a coating material selected form the group consisting of thermosetting resins, engineering plastics, general-purpose resins, polymer alloys, butadiene nitrile rubber, and high elasticity resins.

4. A wet multiplate clutch comprising plural friction plates and plural separator plates that are alternately arranged with the plural friction plates, wherein said separator plates are groove-free separator plates, wherein between each two friction plates arranged adjacent to each other, at least two of the plural groove-free separator plates are disposed separably from each other, wherein the at least two separator plates are completely separate from each other and can freely move independently of each other, and wherein each two mutually-adjacent ones of said plural groove-free separator plates disposed between each two friction plates arranged adjacent to each other have been machined at mutually-opposing surfaces thereof.

5. A wet multiplate clutch according to claim 4, wherein said groove-free separator plates have a thickness of from 0.5 to 1.52 mm per plate.

6. A wet multiplate clutch according to claim 4, wherein said mutually-opposing surfaces of said each two mutually adjacent groove-free separator plates have been machined by shot blasting.

7. A wet multiplate clutch according to claim 4, wherein said mutually-opposing surfaces of said each two mutually adjacent groove-free separator plates have been machined by shot peening.

* * * * *